(12) United States Patent
Hojjatie et al.

(10) Patent No.: US 10,005,667 B2
(45) Date of Patent: Jun. 26, 2018

(54) SULFUR DIOXIDE SCRUBBING SYSTEM AND PROCESS FOR PRODUCING POTASSIUM PRODUCTS

(71) Applicant: Tessenderlo Kerley, Inc., Phoenix, AZ (US)

(72) Inventors: Michael Massoud Hojjatie, Tucson, AZ (US); Constance Lynn Frank Lockhart, Tucson, AZ (US); Alexandros Dimitriadis, Chandler, AZ (US); Mark P. Clarkson, Gilbert, AZ (US); Harry Charles Kominski, Phoenix, AZ (US); Jeroen Van Cauwenbergh, Baardegem (BE); Nicholas S. Shult, Maricopa, AZ (US); Adam T. Goldsmith, Chandler, AZ (US)

(73) Assignee: Tessenderlo Kerley, Inc., Phoenix, AZ (US)

( * ) Notice: Subject to any disclaimer, the term of this patent is extended or adjusted under 35 U.S.C. 154(b) by 0 days. days.

(21) Appl. No.: 15/380,702

(22) Filed: Dec. 15, 2016

(65) Prior Publication Data

US 2017/0190575 A1    Jul. 6, 2017

Related U.S. Application Data

(60) Provisional application No. 62/273,389, filed on Dec. 30, 2015.

(51) Int. Cl.
*B01D 53/50* (2006.01)
*C01B 17/62* (2006.01)
(Continued)

(52) U.S. Cl.
CPC .......... *C01B 17/64* (2013.01); *B01D 53/1481* (2013.01); *B01D 53/502* (2013.01);
(Continued)

(58) Field of Classification Search
CPC .............. B01D 53/1481; B01D 53/502; B01D 2251/306; B01D 2251/60; B01D 2252/10;
(Continued)

(56) References Cited

U.S. PATENT DOCUMENTS

| 3,369,866 A | 2/1968 | Spormann et al. |
| 3,937,787 A * | 2/1976 | Gorin ................. B01D 53/1481 |
| | | 423/243.01 |

(Continued)

FOREIGN PATENT DOCUMENTS

| CN | 102423612 B | 5/2014 |
| FR | 2534571 A1 | 4/1984 |

OTHER PUBLICATIONS

European search report dated Jul. 29, 2016 of European Patent Office in corresponding EPO Patent App. No. 16156275.6-1354.
(Continued)

*Primary Examiner* — Timothy C Vanoy
(74) *Attorney, Agent, or Firm* — Fennemore Craig, P.C.

(57) ABSTRACT

The invention relates to a process for preparing potassium thiosulfate, potassium sulfite or potassium bisulfite comprising the following steps:
  Step (1a): providing a potassium hydroxide or potassium carbonate solution for neutralizing acid forming components such as dissolving $SO_2$ or $H_2S$;
  Step (1b): providing an $SO_2$ contacting solution, containing at least some potassium sulfite or potassium bisulfite or potassium thiosulfate;
  Step (2): providing $SO_2$ gas;
  Step (3): reacting these to absorb the $SO_2$ gas and to form an intermediate reaction mixture comprising potassium sulfite, or potassium bisulfite or a mixture thereof, and optionally recovering the potassium sulfite, or potassium bisulfite or a mixture thereof, and/or optionally using steps 4 and 5;

(Continued)

Step (4): adding sulfur or sulfide containing compound containing sulfur having the oxidation state of 0, −2 or of between 0 and −2 to the reaction mixture and optionally potassium hydroxide or potassium carbonate, and reacting the mixture under suitable conditions to form potassium thiosulfate; and Step (5): recovering the potassium thiosulfate, and optionally concentrating the potassium thiosulfate.

22 Claims, 2 Drawing Sheets

(51) Int. Cl.
    *C01B 17/64*     (2006.01)
    *B01D 53/14*     (2006.01)

(52) U.S. Cl.
    CPC ........ *C01B 17/62* (2013.01); *B01D 2251/306* (2013.01); *B01D 2251/60* (2013.01); *B01D 2252/10* (2013.01); *B01D 2257/2045* (2013.01); *B01D 2257/302* (2013.01); *B01D 2257/80* (2013.01); *B01D 2258/02* (2013.01); *B01D 2258/0283* (2013.01)

(58) Field of Classification Search
    CPC .......... B01D 2257/302; B01D 2258/02; B01D 2258/0283; C01B 17/62; C01B 17/64
    See application file for complete search history.

(56) References Cited

U.S. PATENT DOCUMENTS

| | | | | |
|---|---|---|---|---|
| 4,208,395 | A | * | 6/1980 | Gorin ................... B01D 53/501 423/243.08 |
| 4,976,937 | A | * | 12/1990 | Lee ....................... B01D 53/501 423/243.09 |
| 5,567,406 | A | | 10/1996 | Zeller, III et al. |
| 5,944,868 | A | | 8/1999 | Faynshteyn et al. |
| 8,034,318 | B1 | | 10/2011 | Hojjatie et al. |
| 2012/0255335 | A1 | | 10/2012 | Fairweather |

OTHER PUBLICATIONS

International Search Report dated Mar. 22, 2017 in International Application No. PCT/US16/67313.

Written Opinion of the International Searching Authority dated Mar. 22, 2017 in International Application No. PCT/US16/67313.

Bichowsky "Equilibrium in the Reaction between Sulfur Dioxide and Water", Journal of the American Chemical Society, Jan. 1922, vol. 44, pp. 116-132.

Agency for Toxic Substances and Disease Registry (ATSDR), "Toxicological Profile for Sulfur Dioxide", Dec. 1998 (https://www.atsdr.cdc.gov/ToxProfiles/tp116.pdf); p. 109.

English translation of FR 2,534,571 A1 that was transmitted with ISR dated Mar. 22, 2017 in International Application No. PCT/US16/67313.

* cited by examiner

SULFUR DIOXIDE SCRUBBING SYSTEM AND PROCESS FOR PRODUCING POTASSIUM PRODUCTS

CROSS-REFERENCE TO RELATED APPLICATIONS

This application claims priority to U.S. provisional application No. 62/273,389 filed on Dec. 30, 2015, which is hereby incorporated herein by reference for all that it discloses.

FIELD OF THE INVENTION

The present invention relates to a process for the preparation of potassium thiosulfate, or potassium sulfites and/or potassium bisulfites.

BACKGROUND OF THE INVENTION

The thiosulfate ion, $S_2O_3^{2-}$, is a structural analogue of the $SO_4^{2-}$ ion in which one oxygen atom is replaced by one S atom. However, the two sulfur atoms in $S_2O_3^{-2}$ are not equivalent. One of the S atoms is a sulfide-like sulfur atom that gives the thiosulfate its reducing properties and complexing abilities.

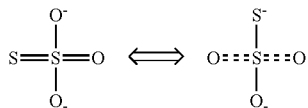

Thiosulfates are used in leather tanning, paper and textile manufacturing, flue-gas desulfurization, cement additives, dechlorination, ozone and hydrogen peroxide quenching, coating stabilizers, as an agricultural fertilizer, as a leaching agent in mining, and so on.

Due to these complex-forming abilities with metals, thiosulfate compounds have also been used in commercial applications such as photography, waste treatment and water treatment applications.

Thiosulfates do however readily oxidize to dithionates, trithionates, tetrathionates, and finally to sulfates:

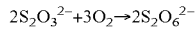

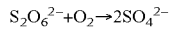

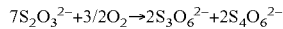

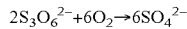

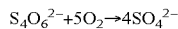

Due to this transformation, thiosulfates are used as fertilizers in combination with cations such as ammonium, potassium, magnesium and calcium. The ammonium, alkali metal and alkaline earth thiosulfates are soluble in water. Water solubilities of thiosulfates decrease from ammonium to alkali metals to alkaline earth thiosulfates.

Potassium (K) is a primary plant nutrient. Potassium is associated with movement of water, nutrients, and carbohydrates in plant tissue. If potassium is deficient or not supplied in adequate amounts, growth is stunted and yields are reduced. Potassium stimulates early growth, increases protein production, improves the efficiency of water use, is vital for stand persistence in cold weather, and improves resistance to disease and insects.

Potassium thiosulfate fertilizer contains the highest percentage of potassium in liquid form, compared to other sources of potassium such as potassium chloride (KCl), potassium nitrate ($KNO_3$), and potassium sulfate ($K_2SO_4$). In addition, it combines potassium with sulfur (17%) which is also an essential plant nutrient.

It is contemplated that potassium thiosulfate could be produced by several alternative routes such as:

I. Reaction of S and $SO_3^{2-}$ in neutral or alkaline medium

II. Reaction of $S^{2-}$ and $SO_3^{2-}$ (via $SO_2$ and $HSO_3^{2-}$)

III. Oxidation of Potassium Hydrosulfide (KSH)

IV. Ion Exchange reaction between alkaline thiosulfates and potassium chloride or nitrate V. Salt exchange between alkaline thiosulfates and Potassium Chloride or Nitrate VI. Oxidation of Potassium Polysulfide However, some of these alternatives present serious difficulties or disadvantages. Route I and II are longer processes and require the use of sulfur dioxide $SO_2$. Both these routes are described when the scrubbing of the air pollutant sulfur dioxide is an objective. Route III requires handling of potassium hydrosulfide as a raw material which is not favorable due to a hydrogen sulfide environment. Routes IV and V suffer from the drawback that ion exchange and salt exchange require expensive raw materials and equipment, and also require a step of final stripping due to the need for working with dilute solutions. The prior art has been unsuccessful producing high purity potassium thiosulfate via Route VI with low byproducts. Thiosulfates, in general, are susceptible to further conversion to sulfite and sulfate under adverse temperature, and pressure.

SUMMARY OF THE INVENTION

Described herein are processes, preferably continuous, for the preparation of potassium thiosulfate in relatively high concentration with relatively low amounts of soluble or solid byproducts. The process may be used to produce a substantially clear solution having a relatively high percentage of potassium, and almost neutral pH, making it very suitable as a chlorine-free liquid fertilizer, for example as a foliar fertilizer, starter fertilizer, in furrow fertilizer and the like, and optionally in combination with other fertilizers.

Also described herein are processes, preferably continuous, for the preparation of potassium sulfite, potassium bisulfite or mixtures thereof as a substantially clear solution having a relatively high percentage of potassium and almost neutral pH, making it suitable as a liquid fertilizer, for example as a foliar fertilizer, in furrow fertilizer and the like.

Generally, the process of the present invention provides a method for preparing potassium thiosulfate, comprising the following steps:

Step (1a): providing a potassium hydroxide or potassium carbonate solution for neutralizing acid forming components;

Step (1b): providing a $SO_2$ contacting solution, comprising or containing at least some potassium sulfite or potassium bisulfite or potassium thiosulfate;

Step (2): providing sulfur dioxide gas;

Step (3): reacting these to absorb the $SO_2$ gas and to form a reaction mixture comprising potassium sulfite, potassium bisulfite or mixtures thereof, which may be sulfite rich potassium thiosulfate;

Step (4): adding sulfur or sulfide containing compound containing sulfur having the oxidation state of 0, −2 or of between 0 and −2 to the reaction mixture and optionally potassium hydroxide or potassium carbonate, and reacting the mixture under suitable conditions to form potassium thiosulfate; and Step (5): recovering the potassium thiosulfate and, optionally concentrating the potassium thiosulfate.

Furthermore, the present invention provides a process for preparing potassium sulfite, potassium bisulfite or a mixture thereof, comprising the following steps:

Step (1a): providing a potassium hydroxide or potassium carbonate solution for neutralizing-acid forming components;

Step (1b): providing a $SO_2$ contacting solution, comprising at least potassium sulfite;

Step (2): providing sulfur dioxide gas; and

Step (3): reacting these to form a reaction mixture comprising potassium sulfite, or potassium bisulfite or a mixture thereof, and recovering the potassium sulfite, or potassium bisulfite or a mixture thereof.

DETAILED DESCRIPTION OF THE INVENTION

Figure 1:
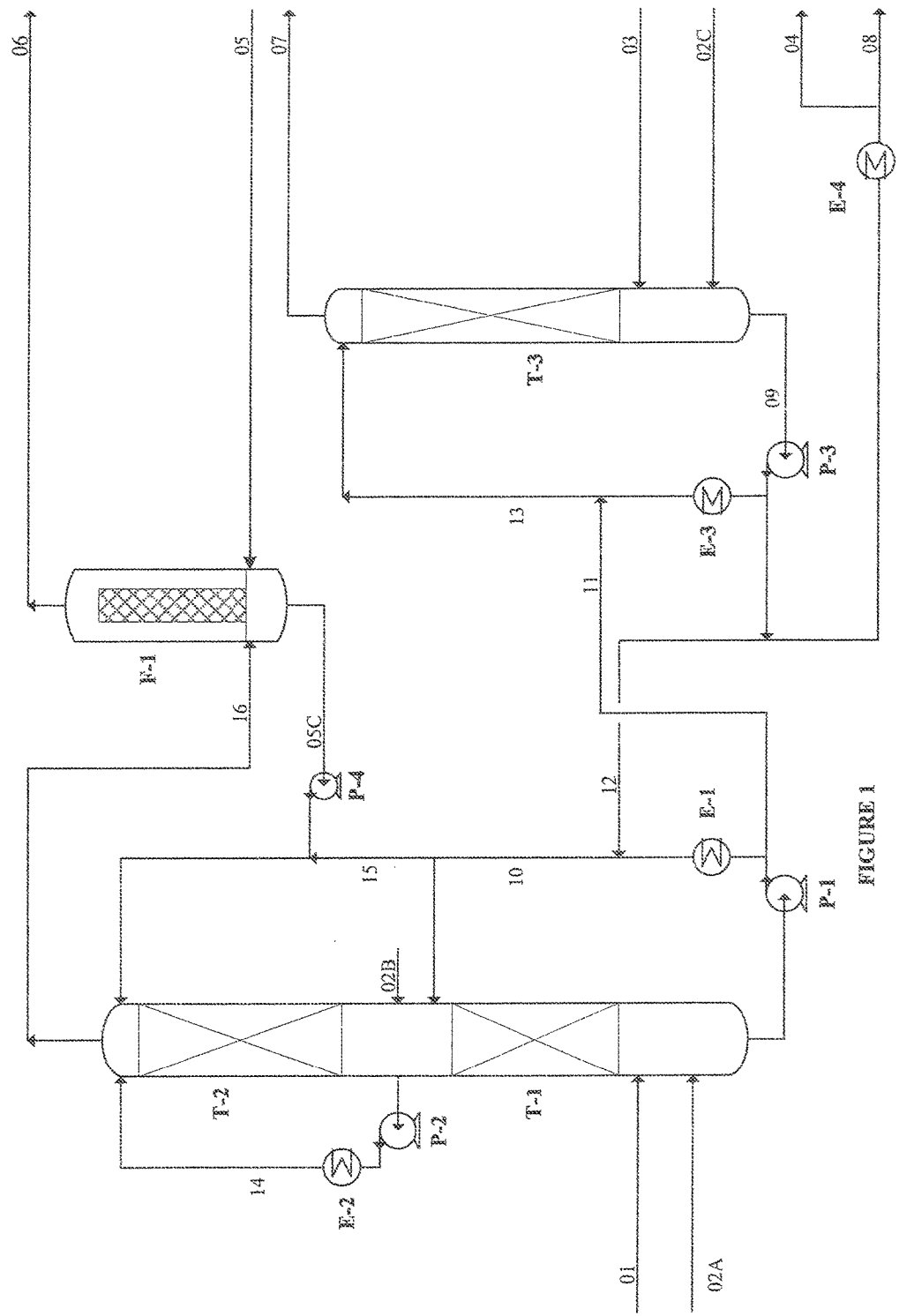
FIG. 1 is a schematic representation of a process according to an embodiment of the invention.

It is an object of the present invention to provide a method for production of potassium thiosulfate by reaction of an intermediate with a sulfite/bisulfite composition wherein relatively inexpensive raw materials, such as sulfur, water, sulfur dioxide and hydrogen sulfide gas are used, and wherein relatively high purity potassium thiosulfate can be obtained. Potassium hydroxide, potassium carbonate, potassium polysulfide, potassium sulfide or potassium bisulfide are other raw materials that may be used in this approach.

It is another objective of the present invention to produce a concentrated potassium thiosulfate solution.

It is still another objective of this invention to produce potassium thiosulfate with relatively low residual contamination from byproducts, in particular soluble or solid byproducts.

It is still another objective of the present invention to produce potassium thiosulfate by a continuous operation approach.

It is still another objective of the present invention to produce potassium thiosulfate by using waste gas, such as hydrogen sulfide, and converting the waste gas to sulfur or sulfur dioxide or for direct absorption for this operation.

It is still another objective of the present invention to use sulfur dioxide as pristine gas by burning sulfur with oxygen or by using sulfur dioxide from waste tail gas operations or coke operations or flue gas containing sulfur dioxide.

It is still another objective of the present invention to provide a method which allows production of a stable potassium thiosulfate product of close to neutral pH, and with a shelf life sufficient for commercial use.

One or more of the objectives as described above are obtained with the processes as described below. Also, one or more of said objectives are obtained with the apparatus as described below.

One or more of the objectives as described above are obtained with the process according to the present invention, describing (preferably continuous) processes for the preparation of potassium thiosulfate in relatively high concentration with relatively low amount of soluble contaminants such as sulfite, and sulfate.

In a preferred embodiment, controlling process parameters such as mole ratio of the raw materials, pH, temperature, concentration and composition of the intermediate potassium sulfite/bisulfite can result in a preferred clear solution with a high percentage of potassium in liquid form. The liquid may have an almost neutral pH, which makes this suitable as a liquid fertilizer, such as a foliar fertilizer. The potassium thiosulfate may be used as such, or in admixture with other compatible fertilizers, micronutrients, additives, and/or the like.

One or more of the objectives as described above are obtained with the processes according to the present invention describing preparation of potassium thiosulfate from an intermediate rich in sulfite and preferably under appropriate conditions, and using preferred mole ratios of raw materials, producing a liquid solution of potassium thiosulfate in relatively high concentration with relatively low amounts of solid or soluble byproducts.

Generally, the process for preparing potassium thiosulfate of the present invention comprises the following steps:

Step (1a): providing a potassium hydroxide or potassium carbonate solution for neutralizing acid forming components;

Step (1b): providing a $SO_2$ contacting solution, comprising or containing at least some potassium sulfite or potassium thiosulfate;

Step (2): providing sulfur dioxide gas;

Step (3): reacting these (i.e., the potassium hydroxide or potassium carbonate, the $SO_2$ contacting solution and the $SO_2$ gas) to form a reaction mixture comprised of potassium sulfite, or potassium bisulfite or a mixture thereof. (The reaction mixture may be sulfite rich potassium thiosulfate);

Step (4): adding (i) sulfur and/or (ii) hydrogen sulfide and/or (iii) potassium polysulfide and/or (iv) potassium sulfide and/or (v) potassium bisulfide to the reaction mixture, and reacting the mixture under suitable conditions to form potassium thiosulfate; and Step (5): recovering the potassium thiosulfate and optionally concentrating the potassium thiosulfate.

Recovering the potassium thiosulfate means separating the potassium thiosulfate from the process to obtain a product that can be stored, transported and sold.

The process for preparing potassium thiosulfate provides a preferably continuous non-regenerative sulfur dioxide scrubbing system and process for the production of potassium products including potassium thiosulfate.

The above described process steps 1-3 can also be used to provide potassium sulfite, or potassium bisulfite or a mixture thereof. Recovering said potassium sulfite, or potassium bisulfite or a mixture thereof means separating said product from the process to obtain a product that can be stored, transported and sold.

The $SO_2$ provided in the process may originate from any source, which includes for example: burning sulfur with oxygen; sulfur dioxide from tail gas, coke operations, or by converting hydrogen sulfide to sulfur dioxide, or from flue gas of other processes containing $SO_2$.

In addition to producing potassium products, the $SO_2$ gas scrubbing and absorption system may be utilized as a Tail Gas Treating Unit (TGTU) or as a Flue Gas Desulfurization (FGD) system for emissions control by treating and cleaning gas streams containing acidic sulfur components and other acidic gas components before being discharged to atmosphere.

In one embodiment, the present invention utilized as a Flue Gas Desulfurization (FGD) and/or Tail Gas Treating Unit (TGTU) relates to a continuous process and recovery system for the recovery of sulfur dioxide ($SO_2$) contained in combustion gas streams for the purpose of limiting $SO_2$ gas emissions and for the purpose of producing products containing sulfur and potassium.

The $SO_2$ which is reacted is not regenerated as $SO_2$, but is recovered as potassium sulfite/bisulfite mixture, and/or potassium thiosulfate, solution products containing sulfur and potassium; these products can be used as agricultural fertilizers, or can be used for other purposes.

The process may include control of $SO_2$ gas generation and production to control production rate of products to meet market demand and to control $O_2$, $SO_3$ and NOx concentrations in $SO_2$ gas for low sulfate generation and low vent stack gas emissions.

The process may include additional process steps for removal of excess water in a $SO_2$ gas Quench Tower and/or in an evaporator/concentrator, preferably at the end of the process, such as for example an evaporator/concentrator to concentrate the potassium thiosulfate if necessary.

Small amounts of sulfate as $SO_3$ generated in combustion processes producing $SO_2$ gas may be partially removed along with excess water in the $SO_2$ gas Quench Tower as dilute sulfuric acid; the sulfuric acid may then be utilized in other process equipment such as pH control of cooling tower or may be neutralized and discharged as waste water.

Further sulfate removal from potassium sulfite, or potassium bisulfite or a mixture thereof and/or potassium thiosulfate products, if necessary, may be done in the product filtration step of the process, to remove solid crystals of potassium sulfate which have low solution solubility in the concentrated potassium sulfite, or potassium bisulfite or a mixture thereof solution and/or potassium thiosulfate product solution.

With proper design and control of the combustion system and the $SO_2$ recovery system, it is possible to limit oxidation of $SO_2$ and sulfite in the $SO_2$ recovered products resulting in products low in sulfate. The $SO_2$ gas stream contaminants which may be either wholly or partially eliminated or removed include but are not limited to: $O_2$, $SO_3$, $NO_N$, HCl, $H_2O$ and fly ash.

Potassium hydroxide or another base-potassium source like potassium carbonate is used (step 1a) as the alkaline feed for process reactions, pH control and the source of potassium for the process and potassium products produced. Potassium hydroxide is the preferred alkaline feed and source of potassium for the process.

The potassium base is used for neutralizing acid forming components such as $SO_2$ or $H_2S$.

The potassium base is preferably used as a solution, such as for example 0.1 Molar to 13.5 Molar solution. Preferably, the solution has a concentration of about 5 to 13.5 Molar. Optionally, a base-potassium source solution is formed by combining dry or solid potassium hydroxide or potassium carbonate with water. The dry or solid potassium hydroxide or potassium carbonate may be in any suitable form, such as beads, flakes or pellets.

Either a solution of potassium sulfite, or potassium bisulfite or a mixture thereof or a potassium thiosulfate solution (or a mixture comprising potassium thiosulfate with potassium sulfite and/or potassium bisulfite) may be utilized as the primary $SO_2$ scrubbing solution (step 1b) in a $SO_2$ absorber to scrub and absorb $SO_2$ from a gas stream containing $SO_2$ to produce scrubbing solution containing potassium sulfite/bisulfite.

The primary $SO_2$ scrubbing solution is typically a concentrated recirculating solution of potassium sulfite, or potassium bisulfite or a mixture thereof formed from the addition of $SO_2$, potassium hydroxide and dilute potassium sulfite, or potassium bisulfite or a mixture thereof or water from other process streams.

Alternatively, concentrated potassium thiosulfate from a downstream reactor may be recycled to the absorption tower if the hot $SO_2$ gas is used to evaporate excess water, or in the case there is excess alkalinity in the potassium thiosulfate in the downstream reactor which can be carried forward to the absorption tower, or in the case where reduced oxidation to sulfate is desired.

A secondary $SO_2$ scrubbing step in $2^{nd}$ Stage $SO_2$ Scrubber may be utilized for additional $SO_2$ absorption and recovery. Optionally, a final gas treating step using fiber bed gas filters may be utilized to filter out sulfur containing particulates, for additional control of vent stack gas emissions.

In one embodiment, where dilute solution of potassium sulfite, or potassium bisulfite or a mixture thereof from other places in the process is added to the primary $SO_2$ scrubbing solution, a concentrated solution of potassium sulfite, or potassium bisulfite or a mixture thereof is obtained. This concentrated solution of potassium sulfite, or potassium bisulfite or a mixture thereof may be marketed as the potassium product or may be further processed to produce the potassium thiosulfate product.

The total potassium salt concentration of this concentrated solution of potassium sulfite, or potassium bisulfite or a mixture thereof is preferably about 35-41 wt % potassium sulfite, potassium bisulfite and potassium sulfate, even more preferably about 38-40 wt % total salt solution concentration. The pH preferably is between about 7 to about 8.5.

In another embodiment, a potassium thiosulfate solution may be utilized as the primary $SO_2$ scrubbing solution to scrub and absorb $SO_2$, thereby producing a sulfite rich potassium thiosulfate solution that may be further processed to produce potassium thiosulfate product solution that is low in sulfite and sulfate content. This sulfite rich potassium thiosulfate solution contains potassium sulfite, potassium bisulfite and potassium thiosulfate; the relative amount of potassium sulfite and potassium bisulfite being dependent on the pH.

The process may include process steps for reacting intermediary products of potassium sulfite, or potassium bisulfite or a mixture thereof or sulfite rich potassium thiosulfate in a sulfur reactor, $H_2S$ gas contactor/reactor, or potassium polysulfide, sulfide, or hydrosulfide reactor to produce potassium thiosulfate that is low in sulfite.

In one embodiment (embodiment i), sulfur may be added to the process in a sulfur reactor for the purpose of converting the $SO_2$ recovery product (the potassium sulfite, or potassium bisulfite or a mixture thereof product obtained after step 3) to potassium thiosulfate product.

In another embodiment (embodiment ii), sulfur may also be added as $H_2S$ from $H_2S$ acid gas streams and $H_2S$ from hydrocarbon gas streams typically generated in oil refineries and gas plants. The $H_2S$ component in these gas streams may be contacted, absorbed and reacted to also produce the potassium thiosulfate product. When contacting, absorbing and reacting $H_2S$ contained in hydrocarbon gas streams, the present invention may be utilized as a replacement for amine units typically used for $H_2S$ removal and recovery.

In a further embodiment, sulfur is provided as a sulfide, as in embodiment (iii) a potassium polysulfide; embodiment (iv) potassium sulfide; or embodiment (v) potassium bisulfide, wherein any of these sulfur compounds is contacted with the solution of potassium sulfite, or potassium bisulfite or a mixture thereof or a potassium thiosulfate solution containing sulfite, for reaction of the polysulfide, sulfide or bisulfide with sulfite to form additional thiosulfate.

Generally, the conversion of sulfite/bisulfite intermediate (i.e., the potassium sulfite, or potassium bisulfite or a mixture thereof) to produce the potassium thiosulfate product takes place at near atmospheric pressure in a sulfur reactor or in an $H_2S$ contactor at $H_2S$ containing gas pressure, or in a liquid-liquid reactor, as the sulfide generally is liquid.

Additional sulfur may also be added to a sulfur/sulfide burner, to increase $SO_2$ production.

The potassium thiosulfate product is particularly suitable as a chlorine-free potassium plant nutrient with a very high potassium concentration in liquid form which can be applied through all types of irrigation systems with no plugging of the drip lines. The liquid could also be converted to form crystalline solid potassium thiosulfate. However, the potassium thiosulfate preferably is used in liquid form.

The potassium product obtained with the process as described above preferably is a fertilizer product, and more preferably a liquid fertilizer product.

The present invention provides a process for preparing a highly concentrated solution of potassium thiosulfate ($K_2S_2O_3$), of which the amount generally is about 40-56 wt %, preferably about 48-56 wt % and most preferably about 50-56 wt %.

The thiosulfate can be of relatively high purity, and the amount of products other than potassium thiosulfate and water is about 5 wt % or less, preferably about 2 wt % or less. Particular impurities are preferably as follows: generally, the amount of sulfate is about 1 wt % or less (measured as potassium sulfate), preferably, about 0.8 wt % or less, and even more preferable about 0.4 wt % or less. Generally, sulfite is present in an amount of about 1 wt % or less, preferably about 0.7 wt % or less (measured as potassium sulfite). Generally, sodium is present in an amount of about 1 wt % or less.

Preferably, the process is performed in such a way that the described products of such good quality can be obtained.

The relatively low amount of other products allows the potassium thiosulfate to have a good storage stability. The preferred storage stability is at least half a year or more, preferably 1 year or more, and even more preferably 2 years or more at ambient temperature. Storage stable means that the liquid remains clear, i.e. no crystals or deposition is visible with the naked eye.

Preferably, the intermediate, sulfite/bisulfite mixture is formed at such a pH that the composition of intermediates favors a high amount of sulfite presence. In one embodiment, the intermediate potassium sulfite/bisulfite is provided at a high pH, which maximizes $SO_2$ absorption but is low enough to prevent the absorption of carbon dioxide, if present in these $SO_2$ waste gas streams.

The high amount of sulfur and potassium in both the intermediary potassium sulfite, or potassium bisulfite or a mixture thereof and in the potassium thiosulfate product is controlled by controlling the solution concentrations. The solution concentrations are controlled by controlling the water content of the product solutions. The water content of the product solutions is controlled by controlling one or more of three process control variables. One is direct control of water addition to the process. The second is removal of water from the process by condensing water out of the $SO_2$ gas stream. The amount of total sulfur, calculated as potassium sulfite, in the potassium sulfite, or potassium bisulfite or a mixture thereof or sulfite rich potassium thiosulfate solution, which is withdrawn from the scrubbing section for reaction with sulfur or sulfide, is generally between about 20 wt % and 41 wt %, preferably between about 30 wt % and 41 wt %. The third process control variable to control water content is concentration by evaporation/boiling of water out of the products. Concentrating would preferably be done on the final potassium thiosulfate product but may also be done on the potassium sulfite, or potassium bisulfite or a mixture thereof product.

This non-regenerative $SO_2$ absorption and recovery system is less complex and less costly to build and operate than other, regenerative $SO_2$ recovery processes or other TGTU's such as SCOT units. This is because there is no need for processing to regenerate $SO_2$ or the $SO_2$ absorption agent used to absorb $SO_2$, or for conversion to $H_2S$ for amine absorption, regeneration and recycle as is done in SCOT TGTU's. Both $SO_2$ and potassium absorption agent are incorporated into sulfur and potassium containing products that have market value primarily as agricultural fertilizers, preferably liquid fertilizer, such as preferably a fertilizer for foliar spray.

DESCRIPTION OF FURTHER PREFERRED EMBODIMENTS OF THE INVENTION

FIG. 1 is a schematic process scheme according to the process of the present invention.

Figure 2:
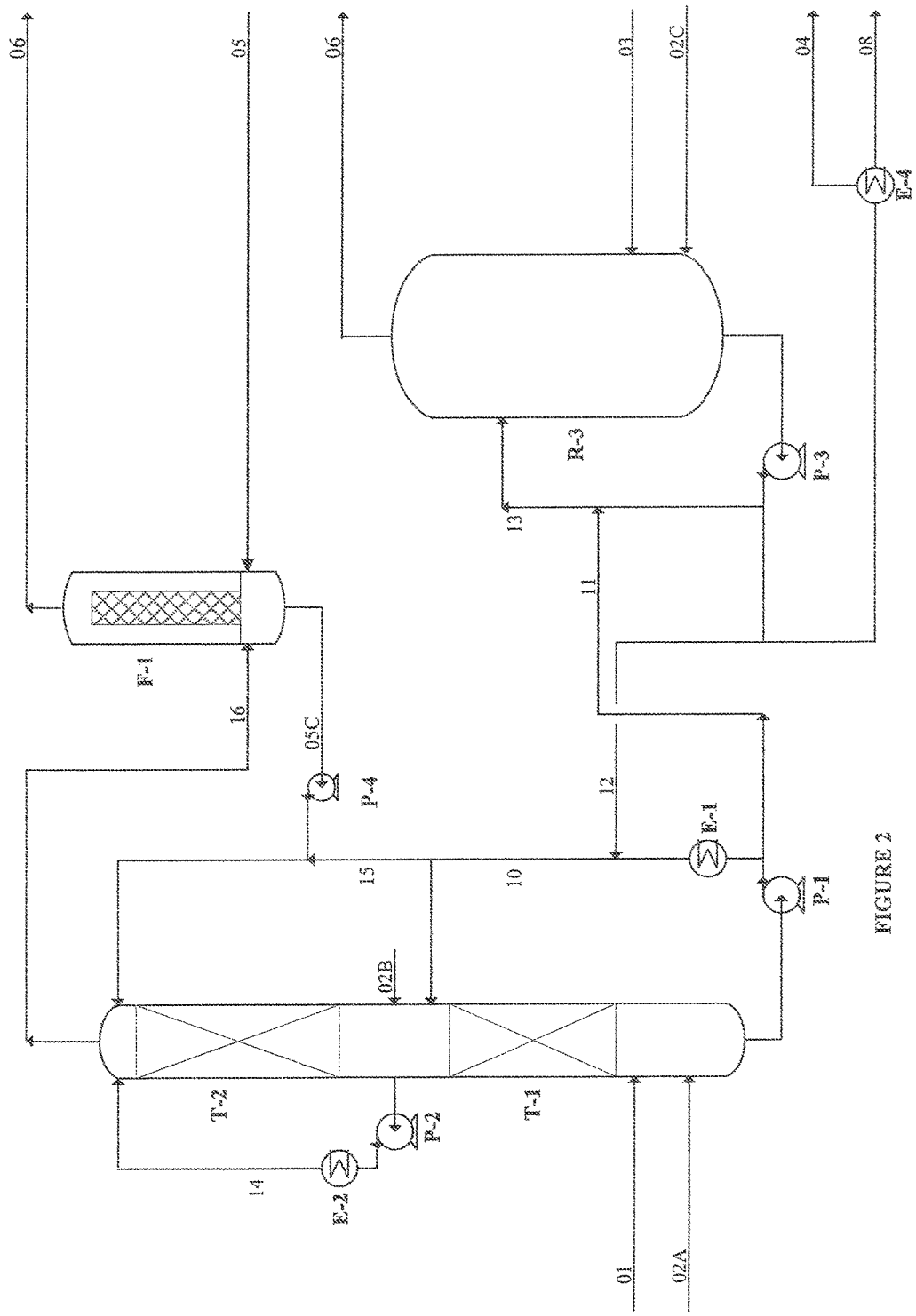
FIG. 2 is a schematic representation of a process according to yet another embodiment of the invention.

FIG. 2 is another schematic process scheme according to the present invention.

The schemes set forth in FIGS. 1 and 2 will be referred to in the detailed description below. The lines and unit numbers have the following meaning, while same numbers in FIGS. 1 and 2 have the same meaning:

Processing Units are denoted with the following numbers in the two schemes:
  T1: Scrubber of $SO_2$ containing gas
  T2: Second scrubber of $SO_2$ containing gas, coming from T1
  T3: packed absorber tower for potassium bisulfite reaction with polysulfide, sulfide, hydrosulfide, sulfur or $H_2S$
  F1: fiber bed Gas Filter
  R3: Sulfur reactor for reaction of liquid sulfur with potassium bisulfite/potassium thiosulfate
  E1, E2, E3, E4: Heat exchangers
  P1, P2, P3, P4: Pumps The following lines numbers represent piping as follows in both schemes:
  01: $SO_2$ containing gas
  02A, 02C, 02: potassium hydroxide or potassium carbonate solution
  03: elemental sulfur feed or $H_2S$ feed gas or polysulfide or sulfide or hydrosulfide stream
  04: evaporated water stream
  05: water feed
  05C: process water from F1
  06: vent stack gas stream
  07: $CO_2$ vented from the reactor
  08: concentrated potassium thiosulfate or potassium bisulfite
  09: potassium thiosulfate solution
  10: potassium bisulfite or potassium thiosulfate-$SO_2$ absorption solution 11: mixture of potassium sulfite and potassium bisulfite solution 12: potassium bisulfite or potassium thiosulfate-$SO_2$ absorption solution 13: recycle stream in $H_2S$ absorption 14: recycle stream for $SO_2$ absorption 15: potassium bisulfite or potassium thiosulfate-$SO_2$ absorption solution 16: vent stack gas stream The preferred embodiment of the invention involves a multi-step process for converting sulfur dioxide into the final potassium thiosulfate product.

An optional preliminary step involves pretreating the sulfur dioxide combustion gas feed stream in a Quench Tower to cool the gas, condense out excess water and remove some of the other acidic gas components such as sulfuric and hydrochloric acid.

The first steps involve absorption and reaction of the sulfur dioxide gas component from the combustion gas stream (step 2) into a solution containing potassium sulfite, or potassium bisulfite or a mixture thereof or potassium thiosulfate (step 1b), while utilizing potassium hydroxide or potassium carbonate as the alkaline absorption agent (step 1a) to provide a potassium sulfite, or potassium bisulfite or a mixture thereof product (step 3).

The next step (step 4) involves reaction of the sulfite ($SO_3^{2-}$), that may be present in the form of bisulfite ($HSO_3^-$), with either sulfur, hydrogen sulfide, potassium polysulfide, potassium sulfide or potassium hydrosulfide as an alternative source of sulfur.

The reaction product formed is potassium thiosulfate ($K_2S_2O_3$), as described in step 5. Potassium thiosulfate is a highly water soluble potassium salt containing two sulfur atoms, making potassium thiosulfate solution high in sulfur content. Optionally, the potassium thiosulfate solution can be concentrated by boiling or evaporating excess water out of solution to produce a concentrated potassium thiosulfate solution or dry potassium thiosulfate product.

The $SO_2$ feed gas formed upstream of the potassium thiosulfate process may be from several different sources including but not limited to (i) incineration of Claus off-gas from refinery and gas plant sulfur recovery units (SRUs), (ii) incineration of sulfur bearing solids, liquids or gasses including $H_2S$/Acid Gas streams, (iii) $SO_2$ streams from regenerative $SO_2$ recovery processes, (iv) pure or concentrated $SO_2$ from other $SO_2$ generation processes and (v) $SO_2$ in flue gas from another combustion or incineration process. The total available quantity of $SO_2$ in the $SO_2$ feed gas sets the amount of potassium thiosulfate product that may be produced.

In a preferred embodiment, additional sulfur bearing feeds may be added to the upstream combustion process for the purpose of controlling and increasing production rate to meet market demand for the potassium thiosulfate and or potassium sulfite, or potassium bisulfite or a mixture thereof products produced. Preferably, the combustion process is carried out in incineration and waste heat recovery process equipment that controls and limits the amount of excess oxygen in the $SO_2$ gas stream (01). Limiting excess oxygen reduces further oxidation of $SO_2$ and the absorbed $SO_2$ as sulfite to sulfate.

Preferably, in a preliminary process step, $SO_2$ is pretreated. In such pretreatment, the $SO_2$ feed gas is cooled and excess water is condensed. Furthermore, preferably, the $SO_2$ is scrubbed to remove acidic and or particulate components from the hot $SO_2$ combustion gas. Although this process step is preferred, it is not a process requirement. In case such step is applied, this is preferably done in a Quench Tower utilizing the dilute acid solution formed from the condensation of water vapor present in the $SO_2$ feed gas along with acid components that may also be present.

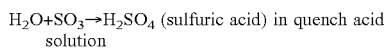
$H_2O+SO_3 \rightarrow H_2SO_4$ (sulfuric acid) in quench acid solution

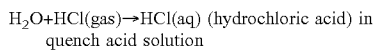
$H_2O+HCl(gas) \rightarrow HCl(aq)$ (hydrochloric acid) in quench acid solution The Quench Tower typically utilizes a circulation pump to circulate the dilute acid solution through a heat exchanger and to the gas/liquid contact zone inside the Quench Tower in order to contact, scrub and cool the $SO_2$ feed gas. The Quench Tower may alternatively be any kind of gas/liquid contacting process equipment including but not limited to spray, packed or tray tower, venture scrubber, inline spray or inline static mixer. As explained, the process objective is to cool the hot $SO_2$ combustion gas, condense excess water and to scrub gas for acidic gas components such as sulfuric and hydrochloric acids which would add undesirable components to the final potassium thiosulfate and or potassium sulfite, or potassium bisulfite or a mixture thereof product. In cases where there is little or no excess water vapor in the $SO_2$ feed gas to be condensed, process water may be added. Process water may also be added to dilute acid concentration in Quench Tower to limit corrosion.

Preferably the $SO_2$ gas is cooled to about 50° C. (120° F.) or less but higher temperatures may be acceptable depending on the desired distribution and balance of water in the process. The dilute acid formed may be utilized for its acid content in another application or it may be neutralized and disposed of as waste water. The $SO_2$ in the $SO_2$ feed gas is slightly soluble in the dilute acid formed and represents a very minor loss of $SO_2$ to the rest of the process. If desired this minor amount of $SO_2$ can be recovered from the dilute acid using a stripping process for $SO_2$ recovery.

For $SO_2$ feed gas formed from combustion of a concentrated sulfur source such as elemental sulfur there is very little or no water vapor formed and no water would be condensed in the Quench Tower. In this case water may be added if cooling and scrubbing is desired. The Quench Tower may also incorporate gas filters to further remove acid fume particles. In any case, the quench operation may be omitted in favor of downstream process alternatives for cooling and removal of excess water and contaminates.

The next process step recovers the $SO_2$ component from the $SO_2$ gas stream (01) to form a solution composed of a mixture of potassium sulfite and potassium bisulfite solution (11) referred to as potassium sulfite, or potassium bisulfite or a mixture thereof. The ratio of sulfite to bisulfite depends on solution pH controlled by the addition of potassium hydroxide or potassium carbonate from stream (02A).

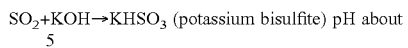
$SO_2+KOH \rightarrow KHSO_3$ (potassium bisulfite) pH about 5

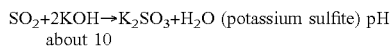
$SO_2+2KOH \rightarrow K_2SO_3+H_2O$ (potassium sulfite) pH about 10

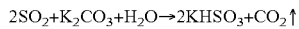
$2SO_2+K_2CO_3+H_2O \rightarrow 2KHSO_3+CO_2\uparrow$

The pH of the solution of potassium sulfite, or potassium bisulfite or a mixture thereof may be controlled over a broad range from about pH 5 to about pH 10 with potassium hydroxide but has preferably a pH of between about 7-9, and more preferably, a pH between about 8.0-8.5 to enhance $SO_2$ absorption efficiency, reject $CO_2$ absorption and increase solution solubility. If no $CO_2$ is present a pH of up to about 10 may be controlled for maximum solution concentration allowing potassium thiosulfate production with sulfur reaction in R-3 as concentrated potassium thiosulfate without the use of evaporator, E-4.

If potassium carbonate is used the pH preferably is limited to less than about 9, more preferably less than about 8.5 to enable disengagement of $CO_2$ from the carbonate in solution. There is however the ability to disengage some remaining $CO_2$, if any, in the third and fourth process steps.

The $SO_2$ gas is contacted by the solution of potassium sulfite, or potassium bisulfite or a mixture thereof or potassium thiosulfate solution in the $SO_2$ Absorber (T-1) where gas/liquid contact results in the absorption and reaction of $SO_2$ from the $SO_2$ gas stream. T-1 typically utilizes a circulation pump, P1 to circulate the potassium sulfite, or potassium bisulfite or a mixture thereof or potassium thiosulfate solution through a heat exchanger E-1 and to the gas/liquid contact zone in order to contact and absorb $SO_2$ from the $SO_2$ feed gas stream (01).

The $SO_2$ Absorber may alternatively be any kind of gas/liquid contacting process equipment including but not limited to spray, packed, tray or bubble tower, venture scrubber, inline spray or inline static mixer.

Both the absorption and reaction of $SO_2$ with solution of potassium sulfite, or potassium bisulfite or a mixture thereof or potassium thiosulfate solution produces heat which is removed by the $SO_2$ Absorber Cooler (E-1). The reaction is primarily with the more alkaline potassium sulfite component in the potassium sulfite, or potassium bisulfite or a mixture thereof or potassium thiosulfate solution to form additional potassium bisulfite at a lower solution pH:

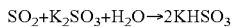

$$SO_2+K_2SO_3+H_2O \rightarrow 2KHSO_3$$

The solution of potassium sulfite, or potassium bisulfite or a mixture thereof or potassium thiosulfate solution pH is controlled with the addition of potassium hydroxide or potassium carbonate from stream (2A) which adds alkalinity back into the potassium sulfite, or potassium bisulfite or a mixture thereof solution to form more potassium sulfite:

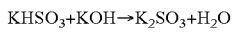

$$KHSO_3+KOH \rightarrow K_2SO_3+H_2O$$

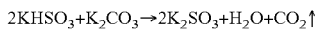

$$2KHSO_3+K_2CO_3 \rightarrow 2K_2SO_3+H_2O+CO_2\uparrow$$

Cooling may be controlled to operate T-1 at any process temperature from about 10-95° C. (50-200° F.) depending on chosen process objectives.

Preferably temperatures are controlled to about 60° C. (140° F.) or less to limit water vapor in vented gas stream. Limiting water vapor in gas reduces the steam plume (condensed water vapor) in the final vent gas that is typically discharged to atmosphere through a vent stack. If steam plume formation from warm water vapor saturated vent gas mixing with cooler atmospheric air is not an environmental issue then, higher T-1 operating temperatures may be utilized in order to allow excess water to leave the process with the vent gas. This can eliminate the use of a Quench Tower for excess water removal and even eliminate the need for E-1 and E-2 cooling requirements. In this case process temperature is controlled by cooling from natural evaporation of water as water vapor from the solution of potassium sulfite, or potassium bisulfite or a mixture thereof or potassium thiosulfate solution. This would also help to produce a more concentrated solution potassium sulfite, or potassium bisulfite or a mixture thereof or potassium thiosulfate with sulfite solution.

To the solution of potassium sulfite, or potassium bisulfite or a mixture thereof (or potassium thiosulfate with sulfite) in T-1 process water from stream (05) can be added to the process which feeds forward to T-2 and then to T-1. T-1 may be any suitable process equipment for gas/liquid contacting but is preferably a contacting spray or packed bed tower.

The addition of a second stage gas contactor, $SO_2$ Scrubber (T-2) may be required for extended contacting of the $SO_2$ gas stream for additional $SO_2$ recovery and removal. This allows for very low loss of $SO_2$ with vent gas so very low $SO_2$ emissions are obtained in the vent gas discharged to atmosphere. T-2 operates as a gas/liquid contactor in the same manner as T-1.

In one embodiment, the scrubbing solution is a dilute or weak potassium sulfite, or potassium bisulfite or a mixture thereof solution. The solution pH may be controlled with the addition of potassium hydroxide or carbonate from stream (02B) over a broad range of pH from about 5-10 but preferably about 7-9 and more preferably about 8.0-8.5 to enhance $SO_2$ absorption efficiency and reject $CO_2$ absorption. The dilute solution of potassium sulfite, or potassium bisulfite or a mixture thereof generated passes to and becomes part of T-1 potassium sulfite, or potassium bisulfite or a mixture thereof solution. The produced T-1 potassium sulfite, or potassium bisulfite or a mixture thereof solution is considered an intermediate product that undergoes further processing in the third process step to become potassium thiosulfate. However, potassium sulfite, or potassium bisulfite or a mixture thereof may also be taken off from the process as a separate product.

In another embodiment, the scrubbing solution contains potassium thiosulfate, and optionally some potassium sulfite, or potassium bisulfite or a mixture thereof. The pH preferences as described in the former paragraph apply equally.

In a further embodiment, a last process operation of the step to recover $SO_2$ and clean the gas before discharge to atmosphere is to filter the gas through fiber bed Gas Filter (F-1). This Gas Filter has proven to be useful in addition to gas contacting in the Quench Tower, T-1 and T-2 because of some residual submicron acid fume particles remaining in the gas stream that are not absorbed into solution. This dilute acid collected by the Gas Filter may be fed forward with process water as shown in the schemes 1 and 2, or may alternatively be drawn off separately for use as dilute acid or neutralized for waste water disposal.

The next process step (step 4) involves conversion of potassium sulfite, or potassium bisulfite or a mixture thereof (which may also be sulfite rich potassium thiosulfate) produced in the $SO_2$ absorption process step, to potassium thiosulfate, by way of reaction with additional sulfur.

The additional sulfur may be elemental sulfur having a chemical valence of 0. The additional sulfur may also be hydrogen sulfide sulfur having a chemical valence of −2 as a gas or as a liquid in a potassium-based solution as potassium sulfide and or potassium hydrosulfide. The additional sulfur may also be a mixture of elemental and hydrogen sulfide sulfur with potassium hydroxide as potassium polysulfide, which may have an average valence between 0 and −2.

Additional potassium hydroxide or potassium carbonate may be added as required to maintain potassium thiosulfate reaction product pH and in the case where potassium thiosulfate reaction product has elevated pH with excess KOH from reaction with potassium sulfide the potassium thiosulfate can be recirculated to T-1 for reaction with $SO_2$ to lower pH and consume excess KOH.

The chemical reactions to produce potassium thiosulfate may be represented by the chemical equations:

$KHSO_3+S+KOH \rightarrow K_2S_2O_3+H_2O$ (reaction with sulfur)

$KHSO_3+K_2SO_3+H_2S \rightarrow 1.5K_2S_2O_3+1.5H_2O$ (reaction with hydrogen sulfide)

$2KHSO_3+KHS \rightarrow 1.5\ K_2S_2O_3+1.5H_2O$ (reaction with hydrosulfide)

$KHSO_3+K_2S+SO2 \rightarrow 1.5\ K_2S_2O_3+0.5H_2O$ (reaction with sulfide and $SO_2$)

$5KHSO_3+K_2S_4+2KOH \rightarrow 4.5K_2S_2O_3+3.5H_2O$ (reaction with polysulfide).

In one embodiment (embodiment i), in this process step (step 4) potassium sulfite, or potassium bisulfite or a mixture thereof or sulfite rich potassium thiosulfate is reacted with additional elemental sulfur. This step can be carried out in any process equipment that promotes contacting of reaction mixture with elemental sulfur. The potassium thiosulfate/ sulfur reactor (R-3) is preferably a Continuously Stirred Tank Reactor (CSTR).

The elemental sulfur feed, stream (03) may be either solid or liquid/molten sulfur but preferably molten so that the stirring action in the reactor breaks up the molten sulfur feed as it cools to form small solid sulfur particles. The small sulfur particles advantageously have a large total surface area available for reaction with the potassium thiosulfate solution in the reactor.

The reaction mixture is primarily potassium thiosulfate solution that contains sulfite from the potassium sulfite, or potassium bisulfite or a mixture thereof feed stream (11) into the potassium thiosulfate/sulfur reactor (R-3). The reaction taking place is between the sulfite component supplied by the potassium sulfite, or potassium bisulfite or a mixture thereof and elemental sulfur in the potassium thiosulfate solution to produce additional potassium thiosulfate. The accumulating potassium thiosulfate is preferably taken off on a continuous basis from the continuous process but the reaction could be done on a batch basis if desired.

Preferably the sulfur is suspended in the reacting solution with stirring action in the CSTR. Alternatively the sulfur may be reacted in a fluidized bed reactor where the sulfur is in suspension in the reacting potassium thiosulfate solution by means of a circulation pump or updraft impeller or impellers. Also alternatively the sulfur may be in a static bed where the reacting potassium thiosulfate solution is circulated through the bed.

The reaction may be carried out at any temperature but the reaction is slow and faster reaction is favored at higher temperatures. Preferably the reaction temperature is controlled with heating coils to between about 70 and about 105° C., and more preferably about 93-99° C. (200 to 210° F.) for optimum reaction rates with solid sulfur particles and to limit R-3 to low or atmospheric reactor pressure. Higher reactor temperatures may also be employed but at temperatures above about 121° C. (250° F.), sulfur is in the molten/ liquid state and higher reactor pressure and higher stirring agitation is required to keep molten sulfur disbursed into small droplets.

The reaction pH is controlled to neutral or slightly alkaline with the addition of potassium hydroxide or potassium carbonate, stream (02C). If potassium carbonate is used or if any residual carbonate is present from the potassium bisulfite produced, there will be $CO_2$ vented from the reactor in stream (07). The pH generally is between about 5 and about 9, preferably between about 6 and about 8.

In another embodiment of this step 4 (embodiment ii), this process step is done with hydrogen sulfide gas, and is carried out in any process equipment that promotes gas-liquid contacting for the absorption and reaction of $H_2S$ gas with the potassium thiosulfate plus potassium sulfite, or potassium bisulfite or a mixture thereof reaction mixture.

Preferably the absorption solution is primarily a potassium thiosulfate solution or sulfite rich potassium thiosulfate solution containing some sulfite from potassium sulfite, or potassium bisulfite or a mixture thereof addition, this solution preferably is controlled to neutral or slightly alkaline pH. Reaction temperature is controlled with process cooling preferably above about 50° C. (120° F.) to minimize condensation of hydrocarbons and preferably below about 82° C. (180° F.) to limit moisture in unabsorbed T-3 vent gas. The pH generally is between about 5 and about 9, preferably between about 6 and about 8.

Preferably the absorption and reaction of $H_2S$ gas is carried out in a packed absorber tower referred to as the Hydrogen Sulfide Absorber Tower (T-3) in FIG. 1. The $H_2S$ feed gas stream (03) may consist of 100% $H_2S$ gas to gas streams containing less than 1% $H_2S$. Preferably the $H_2S$ gas stream is a concentrated $H_2S$ gas stream containing 50% or more $H_2S$ and is referred to as acid gas in gas plants and refineries coming off amine units used to remove $H_2S$ from hydrocarbon streams. The absorption and reaction is selective for $H_2S$ and rejects $CO_2$ and hydrocarbons that may be in the $H_2S$, acid gas feed stream (03) to T-3.

This embodiment of the process, step 4, for selectively absorbing and reaction of $H_2S$ with potassium sulfite, or potassium bisulfite or a mixture thereof (or sulfite rich potassium thiosulfate) to produce potassium thiosulfate may be used in special applications for $H_2S$ recovery and removal from gas streams. Using potassium sulfite, or potassium bisulfite or a mixture thereof as a selective, non-regenerative absorption agent for $H_2S$ may be used as a process alternative for amine treating $H_2S$ containing streams. In many small and remote locations not having the required utilities and infrastructure to support a regenerative amine treating process operation, potassium sulfite, or potassium bisulfite or a mixture thereof may be imported or produced on site to be used as a non-regenerative $H_2S$ recovery reagent producing potassium thiosulfate. This process step may also be used in large gas plants and refineries in place of amine units to off load amine treating capacity and the acid gas produced by amine treating going to sulfur recovery units and thus increase overall amine treating and sulfur recovery capacity.

In large sulfur recovery operations that are typically found in oil refineries and gas plants, this potassium thiosulfate process may be used to supplement or substitute sulfur recovery operations resulting in increased total sulfur recovery capacity or alternative sulfur recovery operations for the facility.

Sulfur bearing $H_2S$/Acid Gas may alternatively be diverted from the main Claus Sulfur Recovery units to an incinerator for combustion to form an $SO_2$ gas stream. This effectively off loads the main Claus SRU for more total sulfur recovery capacity for the facility. Also directing $H_2S$/Acid Gas to the T-3, $H_2S$ Absorber off loads additional $H_2S$ gas going to the Claus SRUs. Treating incinerated Claus off gas in the $SO_2$ absorption step of the process eliminates the need for other more process demanding regenerative Claus tail gas treating units such as SCOT units which typically recycle $H_2S$/Acid Gas back to the Claus SRU which reduces Claus SRU capacity.

In another embodiment (embodiment iii), this process step (step 4) to react potassium sulfite, or potassium bisulfite or a mixture thereof or sulfite rich potassium thiosulfate, is performed with potassium polysulfide.

In yet another embodiment (iv), potassium sulfide is used, while in embodiment (v), potassium bisulfide is used.

Any of these embodiments may be carried out in process equipment that promotes mixing of the reaction mixture. This is a liquid-liquid reaction which takes place much faster than with elemental sulfur which is a solid-liquid reaction. In this liquid-liquid reaction case, elevated reaction temperature and strong mixing is not required. The reaction pH is controlled to neutral or slightly alkaline with the addition of potassium hydroxide or potassium carbonate, stream (02C). If potassium carbonate is used or if any residual carbonate is present from the potassium sulfite, or potassium bisulfite or a mixture thereof produced, there will be $CO_2$ vented from the reactor in stream (07). The pH generally is between about 5 and about 9, preferably between about 6 and about 8.

The final step is recovering the potassium thiosulfate product, i.e. separating the potassium thiosulfate from the process to obtain a product that can be stored, transported and sold. This step of collecting the potassium thiosulfate, may optionally additionally comprise concentrating the potassium thiosulfate solution. If the potassium thiosulfate solution is concentrated, this is done preferably by boiling or evaporating excess water out of solution to produce a concentrated solution or dry potassium thiosulfate product, if required. The potassium thiosulfate solution is typically concentrated to about a 50% or slightly higher solution concentration having a total sulfur concentration of about 17% S using an evaporator or Solution Concentrator (E-4).

The degree of concentration required to produce potassium thiosulfate at about 17% S concentration depends on the amount of excess water that is present in the potassium sulfite, or potassium bisulfite or a mixture thereof/sulfite rich potassium thiosulfate feed obtained in step 3, and in the sulfur feed streams added in step 4 of the process. Elemental sulfur contains no water and can eliminate the need for the concentration step to produce concentrated potassium thiosulfate solution if the potassium sulfite, or potassium bisulfite or a mixture thereof feed to step three is sufficiently concentrated. $H_2S$ gas or polysulfide solution feed to the third step does add water to the potassium thiosulfate produced and generally requires concentration in the final process step to remove excess water.

Although not typical, concentration of the potassium thiosulfate solution may be accomplished by limiting cooling and allowing the temperature in T-1 and T-2 to be sufficiently high to allow water to exit in the vent stack gas as water vapor. This allows for production of a concentrated potassium sulfite, or potassium bisulfite or a mixture thereof solution.

Additionally the potassium sulfite, or potassium bisulfite or a mixture thereof-$SO_2$ absorption solution in T-1 and T-2 may become potassium thiosulfate-$SO_2$ absorption solution if desired by allowing and controlling recycle of potassium thiosulfate between T-1, T-2 and T-3 or R-3 through streams (11, 12 & 15). This potassium thiosulfate-$SO_2$ absorption mode of operation transports potassium thiosulfate solution to the T-1 and T-2 $SO_2$ gas absorption system to allow evaporation of excess water into the vent stack gas stream (06, 16). $SO_2$ absorption by the potassium thiosulfate solution in T-1, T-2 produces a sulfite rich potassium thiosulfate solution which recycles back to T-3 or R-3 for reaction of sulfite to produce additional potassium thiosulfate low in sulfite.

An additional benefit of utilizing potassium thiosulfate solution in T-1 and T-2 is lower sulfate formation caused by partial oxidation of the sulfite component in the potassium thiosulfate absorption solution by residual oxygen in the $SO_2$ combustion gas stream (01). Lower oxidation is realized from lower sulfite concentration in the potassium thiosulfate solution and possibly also from the potassium thiosulfate component in potassium thiosulfate acting as an oxidation inhibitor. Another benefit is the ability to redistribute alkalinity between step two and step three process solutions. Any excess alkalinity coming into step three may be redistributed to step two in stream (12) to where the bulk of alkalinity is required for $SO_2$ absorption and then recycled back to step three in stream (11).

Lower concentration potassium thiosulfate may hold some potassium sulfate in solution. However, concentrated potassium thiosulfate has a low tolerance for potassium sulfate in solution. After concentrating, the potassium thiosulfate solution may be cooled before it is sent to storage in stream (08). On cooling, any significant amount of potassium sulfate above its solubility limit of about 0.9% will crystallize and drop out of solution. The potassium sulfate crystals, if any, may be filtered out of the concentrated potassium thiosulfate solution and processed as a separate product if desired.

As previously described, production volume of potassium bisulfite and potassium thiosulfate may be increased by diverting or adding more sulfur containing feed streams to the $SO_2$ combustion gas equipment or incinerator to increase $SO_2$ production. One of the feed gas streams to the incinerator is from the unabsorbed gas exit T-3, stream (07). Excess $H_2S$ gas to T-3 helps to produce potassium thiosulfate with low residual sulfite concentration and the excess $H_2S$ in stream (07) adds to $SO_2$ combustion gas generation.

The present invention furthermore provides for the continuous production of potassium thiosulfate by (A) providing a sulfur dioxide containing gas stream (01) and potassium containing base (02) to at least one absorption tower (T-1, T-2), while absorbing the gas into an absorption solution containing sulfite and/or thiosulfate (10, 15), which is circulated over the absorption tower (T-1, T-2), and (B) removing part of the absorption solution for obtaining a potassium sulfite containing solution (11) for (C) reacting the potassium sulfite containing solution with sulfur, hydrogen sulfide, potassium sulfide, potassium bisulfide and/or potassium polysulfide (03) with the addition of further potassium base if required (02) to obtain potassium thiosulfate in a vessel (T-3, R-3), recovering potassium thiosulfate (09), and (D) optionally concentrating the potassium thiosulfate in a heat exchanger (E-4) to obtain concentrated potassium thiosulfate (08).

The present invention furthermore provides for a continuous production of potassium sulfite, or potassium bisulfite or a mixture thereof by (A) providing a sulfur dioxide containing gas stream (01) and potassium containing base (02) to at least one absorption tower (T-1, T-2), while absorbing the gas into an absorption solution containing sulfite (10, 15), which absorption solution is circulated over the absorption tower (T-1, T-2), and (B) removing part of the absorption solution for obtaining a potassium sulfite/potassium bisulfite containing solution (11) and (D) optionally concentrating the potassium sulfite/potassium bisulfite in a heat exchanger (E-4) to obtain concentrated potassium sulfite/bisulfite (08).

The embodiments and preferences described for the process, and as exemplified by the description of the drawings apply to the continuous process description provided in the former two paragraphs.

What is claimed:

1. A process for preparing potassium thiosulfate, comprising the following steps:
   Step (1a): providing a potassium hydroxide solution for neutralizing acid forming components;
   Step (1b): providing a $SO_2$ contacting solution, comprising at least some potassium sulfite or potassium bisulfite or a mixture thereof;
   Step (2): providing sulfur dioxide gas;
   Step (3): reacting the solutions of Step 1(a) and Step (1b) with the gas of Step (2) to absorb the $SO_2$ gas and to form a reaction mixture comprising potassium sulfite, or potassium bisulfite, or a mixture of potassium sulfite and potassium bisulfite;
   Step (4): adding sulfur or sulfide containing compound containing sulfur having an oxidation state of 0, −2 or of between 0 and −2 to the reaction mixture and optionally potassium hydroxide, and reacting the mixture under suitable conditions to form potassium thiosulfate; and
   Step (5): recovering the potassium thiosulfate and optionally concentrating the potassium thiosulfate.

2. A process for preparing potassium sulfite, potassium bisulfite or a mixture thereof, comprising the following steps:
   Step (1a): providing a potassium hydroxide solution for neutralizing acid forming components;
   Step (1b): providing a $SO_2$ contacting solution, comprising at least potassium sulfite;
   Step (2): providing sulfur dioxide gas;
   Step (3): reacting these to form a reaction mixture comprising potassium sulfite or potassium bisulfite or a mixture thereof, and
   Step (4) recovering the potassium sulfite, or potassium bisulfite or a mixture thereof.

3. The process according to claim 2, wherein the sulfur dioxide gas originates from burning sulfur with oxygen; sulfur dioxide from tail gas or incinerated tail gas, or by converting hydrogen sulfide to sulfur dioxide.

4. The process according to claim 3, wherein $SO_2$ absorption efficiency is maintained with the addition of alkaline potassium hydroxide to maintain solution pH in the range of a pH between about 5 and about 10.

5. The process according to claim 2, wherein the $SO_2$ gas contains $CO_2$ and the $SO_2$ contacting solution in step (3) is controlled to a pH of less than about 8.5.

6. The process according to claim 2, wherein the process is used as an $SO_2$ gas scrubbing and absorption system, as a Tail Gas Treating Unit (TGTU) for treating and cleaning gas streams containing sulfur components before being discharged to the atmosphere.

7. The process according to claim 2, wherein in step (4), the reaction mixture formed in step (3) is reacted with sulfur or sulfide containing compounds to produce additional potassium thiosulfate, wherein the sulfur or sulfide containing compounds that are utilized in the conversion reaction are selected from sulfur containing compounds containing sulfur having the oxidation state of 0, −2, or a value between 0 and −2, which include elemental sulfur (S), hydrogen sulfide ($H_2S$), potassium sulfide ($K_2S$), potassium hydrosulfide or potassium bisulfide and potassium polysulfide ($K_2S_x$ for x>1 to x=5).

8. The process according to claim 7, wherein the potassium thiosulfate is recovered having a concentration of about 40 wt % or higher, without concentration step.

9. The process according to claim 2, wherein the process is a continuous process.

10. The process for the production of potassium thiosulfate according to claim 1, comprising:
    (A) providing a sulfur dioxide containing gas stream (01) and potassium containing base (02) to at least one absorption tower (T-1, T-2), while absorbing the gas into an absorption solution containing at least some sulfite or bisulfite sulfite, bisulfite, or thiosulfate (10, 15), which absorption solution is circulated over the absorption tower (T-1, T-2), and
    (B) removing part of the absorption solution for obtaining a potassium sulfite containing solution (11) for
    (C) reacting the potassium sulfite containing solution with sulfur, hydrogen sulfide, polysulfide, sulfide and/or bisulfide (03) with the addition of further potassium base if required (02) to obtain potassium thiosulfate in a vessel (T-3, R-3), recovering potassium thiosulfate (09), and
    (D) optionally concentrating the potassium thiosulfate in a heat exchanger (E-4) to obtain concentrated potassium thiosulfate (08).

11. The process for the production of potassium sulfite, or potassium bisulfite or a mixture thereof according to claim 2, comprising:
    (A) providing a sulfur dioxide containing gas stream (01) and potassium containing base (02) to at least one absorption tower (T-1, T-2), while absorbing the gas into an absorption solution containing at least some sulfite or bisulfite (10, 15), which absorption solution is circulated over the absorption tower (T-1, T-2), and
    (B) removing part of the absorption solution for obtaining a solution containing potassium sulfite, potassium bisulfite or mixtures thereof (11) for (D) optionally concentrating the potassium sulfite, potassium bisulfite or mixtures thereof in a heat exchanger (E-4)
to obtain concentrated potassium sulfite, potassium bisulfite or mixtures thereof (08) wherein the concentration of potassium sulfite, potassium bisulfite or mixtures thereof is between 35% and 41%.

12. A liquid potassium product obtained by a process according to claim 2.

13. The liquid potassium product obtained by a process according to claim 1, wherein the potassium product is potassium thiosulfate, water and about 5 wt % or less of other products.

14. The liquid potassium product of claim 13, wherein the impurities comprise an amount of sulfate of about 1 wt % or less (measured as potassium sulfate); and an amount of sulfite of about 1 wt % or less, and an amount of sodium of about 1 wt % or less.

15. The liquid potassium product according to claim 12, wherein the products have a storage stability of at least half a year or more.

16. The process according to claim 1, wherein the sulfur dioxide gas originates from burning sulfur with oxygen; sulfur dioxide from tail gas or incinerated tail gas, or by converting hydrogen sulfide to sulfur dioxide.

17. The process according to claim 1, wherein $SO_2$ absorption efficiency is maintained with the addition of alkaline potassium hydroxide to maintain solution pH in the range of a pH between about 5 and about 10.

18. The process according to claim 1, wherein the $SO_2$ gas contains $CO_2$ and the $SO_2$ contacting solution in step (3) is controlled to a pH of less than about 8.5.

19. The process according to claim 1, wherein the process is used as an $SO_2$ gas scrubbing and absorption system, as a Tail Gas Treating Unit (TGTU) for treating and cleaning gas streams containing sulfur components before being discharged to the atmosphere.

20. The process according to claim 1, wherein in step (4), the reaction mixture formed in step (3) is reacted with sulfur or sulfide containing compounds to produce additional potassium thiosulfate, wherein the sulfur or sulfide containing compounds that are utilized in the conversion reaction are selected from sulfur containing compounds containing sulfur having the oxidation state of 0, −2, or a value between 0 and −2, which include elemental sulfur (S), hydrogen sulfide ($H_2S$), potassium sulfide ($K_2S$), potassium hydrosulfide or potassium bisulfide and potassium polysulfide ($K_2S_x$ for x>1 to x=5).

21. The process according to claim 1, wherein the potassium thiosulfate is recovered having a concentration of about 40 wt % or higher, without concentration step.

22. The process according to claim 1, wherein the process is a continuous process.

* * * * *

UNITED STATES PATENT AND TRADEMARK OFFICE
CERTIFICATE OF CORRECTION

PATENT NO. : 10,005,667 B2
APPLICATION NO. : 15/380702
DATED : June 26, 2018
INVENTOR(S) : Michael Massoud Hojjatie et al.

It is certified that error appears in the above-identified patent and that said Letters Patent is hereby corrected as shown below:

In the Specification

Column 5, Line 45, delete "$NO_N$" and insert -- $NO_X$ --

Signed and Sealed this
Twenty-third Day of October, 2018

Andrei Iancu
*Director of the United States Patent and Trademark Office*